US008229297B2

(12) United States Patent
Fiaschi

(10) Patent No.: US 8,229,297 B2
(45) Date of Patent: Jul. 24, 2012

(54) PROVISION OF ALTERNATIVE COMMUNICATIONS PATHS IN A COMMUNICATIONS NETWORK

(75) Inventor: Giovanni Fiaschi, Genoa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 473 days.

(21) Appl. No.: 12/514,805

(22) PCT Filed: Nov. 16, 2006

(86) PCT No.: PCT/EP2006/068590
§ 371 (c)(1),
(2), (4) Date: Jun. 19, 2009

(87) PCT Pub. No.: WO2008/058574
PCT Pub. Date: May 22, 2008

(65) Prior Publication Data
US 2010/0061720 A1    Mar. 11, 2010

(51) Int. Cl.
*H04B 10/00* (2006.01)
(52) U.S. Cl. ................... 398/2; 398/5; 398/20
(58) Field of Classification Search .............. 398/2–5, 398/10, 19–21
See application file for complete search history.

(56) References Cited

U.S. PATENT DOCUMENTS

| 2002/0191545 | A1 | 12/2002 | Pieda et al. | |
| 2004/0205239 | A1* | 10/2004 | Doshi et al. | 709/241 |
| 2006/0004916 | A1* | 1/2006 | Caviglia et al. | 709/223 |
| 2006/0114818 | A1* | 6/2006 | Canali et al. | 370/216 |
| 2007/0165515 | A1* | 7/2007 | Vasseur | 370/216 |
| 2007/0214280 | A1* | 9/2007 | Patel et al. | 709/239 |

OTHER PUBLICATIONS

Papadimitriou, D. et al. "Shared Risk Link Groups Inference and Processing." IETF, CCAMP Working Group, Internet Draft, Jun. 2003.
Liu, C. et al. "p-Cycle Design in Survivable WDM Networks with Shared Risk Ling Groups (SRLGs)." Proceedings of the 5th International Workshop on Design of Reliable Communication Networks (DRCN 2005), Oct. 16-19, 2005.

* cited by examiner

*Primary Examiner* — Dzung Tran
(74) *Attorney, Agent, or Firm* — Coats & Bennett, P.L.L.C.

(57) ABSTRACT

A method of processing data for computing alternative paths in an optical network (10, 40) including making a list of groups (12, 14, 16, 18, 20, 22, 24, 26) that comprise links wherein the links in a group share a risk of being affected by the same fault, comparing each group (12, 14, 16, 18, 20, 22, 24, 26) with other groups (12, 14, 16, 18, 20, 22, 24, 26) in the list to determine whether each group includes the same links as another group, and deleting the groups (16, 26, 20, 22) that comprise links which are a subset of the links in another group.

8 Claims, 3 Drawing Sheets

PROVISION OF ALTERNATIVE COMMUNICATIONS PATHS IN A COMMUNICATIONS NETWORK

The invention relates to the provision of alternative communications paths (e.g. optical paths) in a communications network, and in particular to a method of processing data for computing alternative paths in an optical communications network, and to a method of determining an alternative path, and to a way of creating an entry in memory containing instructions for an alternative path.

In a circuit-oriented network, or more generally a connection-oriented network, it is known to provide protection to a main optical path for signals by allocating one or more alternative optical paths. Data travelling on the main optical path can be switched to the alternative optical path(s) if the main optical path is affected by a fault. Various protection or restoration schemes are known which require the calculation and allocation of protection paths prior to the occurrence of a fault.

In a real life communications network there may be many hundreds of nodes and many tens of thousands of paths between them that may require protection. It is known to provide protection to a main path by the provision of an alternative path known as a so-called disjointed path. In this known technique each path requiring protection is associated with a so-called disjointed path which is defined as a path that uses different sets of resources (e.g. nodes and optic fibres) to the path requiring protection (so that it can be used as an alternative path). A shared resource is defined as the smallest item of equipment that can be affected by a single fault at the same time on two different paths. When a disjointed path has been correctly determined the main path and the disjointed path cannot be affected by the same fault. The disjointed paths need to be calculated and allocated prior to the occurrence of a fault so that they can be used in the event of a fault. Typically a computer using a known algorithm calculates the disjointed paths for a network. The known algorithm is used once at a defined service provision time when the network is brought into service. It may also be used when structural changes are made to the network. In the context of algorithms for path computation, a network to be protected is represented as a graph of vertices (nodes, switches, routers or network elements) and branches (links connecting the nodes, switches, routers or network elements). The vertices and branches are generally considered as the resources to be protected when deciding whether two paths are disjointed or not.

In a real life communications network the optic fibres are typically carried in bundles which may run in the same duct underground, at least for part of their length. Two different fibres in the duct may connect entirely different nodes of the network but nonetheless may run in the same duct. Wavelength Division Multiplexing (WDM) technology is another example of where resources are shared whereby many paths between nodes run in the same optic fibre and hence share the same resource.

It is also known to improve the above method of computing alternative paths. The Internet Engineering Task Force (IETF) has provided a classification for a set of resources that can be affected by the same fault at the same time. This is known as a Shared Risk Link Group (SRLG). The same concept is known as a Shared Risk Group (SRG) by the International Telecommunications Union (ITU). A SRLG is defined as the set of links or optical lines that share a common physical resource (including a fibre link/sub-segment/segment/trunk) i.e. sharing a common risk. For instance, a set of links L belongs to the same SRLG, denoted S, if the links L are established over the same fibre link F.

Information about SRLGs can be typically extracted from administrative files compiled by an operator of the network. Such administrative files usually also include data relating to all of the ducts of the network and the links carried by them. Compiling a list of SRLGs is useful because it allows the calculation of alternative paths using known alternative path calculation algorithms. A problem with using raw SRLG data is that it can be computationally expensive because it is based on set mathematical operations that may require many hundreds of thousands of calculations for a typical network. This can mean that computing alternative paths using a computer processor can be slow, or slower than is desirable. Alternatively, this process may need to be performed on expensive powerful computers—tying them up/using their resources.

We have noticed that a problem with the SRLG data is that much of it can be largely redundant. Since the calculation of alternative paths using SRLG information can be computationally expensive a way of improving the efficiency of the process would be advantageous. We have appreciated that it can be desirable to reduce the SRLG data that is processed by removing redundant data. Determining the SRLG data that is redundant may be a difficult task, particularly in the case of a large network, and any reduction of the amount of data must not remove useful data.

We have realised that what is required is a way of processing SRLG data for a network to reduce the amount of data to be used in the computation of alternative paths whilst minimising the loss of useful data.

According to a first aspect of the invention there is provided a computer-implemented method of processing data for computing alternative paths in an optical communications network including;

making a list of groups that comprise links wherein the links in a group share a risk of being affected by the same fault, comparing each group of the list of groups with other groups in the list to determine whether each group includes the same links as another group, and deleting the groups that comprise links which are a subset of links wholly contained in the links in another group.

Such a method provides a way of processing data before it is input to known routing algorithms to identify alternative paths. A routing algorithm to identify alternative paths can more efficiently use the smaller volume remaining data. A reduction in the number of groups is useful for improving the efficiency of computing alternative paths and may reduce the computing time, or the cost of computing time, by significantly reducing the number of individual calculations that are required to be performed. Furthermore the method minimises redundant data whilst minimising the deletion of useful data. It will be appreciated that due to the reduced amount of data that is produced the method can be used more often, for example every time that a new service is added to the network.

Preferably the method further includes using the remaining groups to calculate alternative paths for links in the network.

Preferably the groups are Shared Risk Link Groups (SRLGs) or Shared Risk Groups (SRGs).

According to a second aspect of the invention there is provided an algorithm which causes a computer to perform the following actions on a list of Shared Risk Link Groups, SRLGs, or Shared Risk Groups, SRGs, each SRLG or SRG comprising links which share a risk of being affected by the same fault:

make a list of unexamined SRLGs or SRGs including therein all the SRLGs or SRGs requiring to be analysed, for each unexamined SRLG x or SRG x
        compare the unexamined SRLG x or SRG x with each of the other unexamined SRLG y or SRG y, and
        if SRLG y or SRG y is a subset of SRLG x or SRG x, delete SRLG y or SRG y and continue to compare SRLG x or SRG x with the other SRLG y or SRG y until all of the SRLG y or SRG y have been compared with the SRLG x or SRG x, and
        if SRLG x or SRG x is a subset of SRLG y or SRG y, delete SRLG x or SRG x and if SRLG x or SRG x has not been deleted, as being a subset of SRLG y or SRG y, mark it as examined and assign it to a reduced list.

According to another aspect the invention comprises a method of reducing the computer processing power required for a computer processor to determine an alternative path from a list of Shared Risk Link Groups, SRLGs, or Shared Risk Groups, SRGs, comprising reducing the list of SRLGs or SRGs to a reduced list in which no SRLG or SRG of the reduced list is a wholly included subset of another SRLG or SRG by deleting those SRLGs or SRGs in the list that are wholly within another SRLG or SRG in the list, and operating an alternative path determining algorithm on the reduced list.

According to another aspect the invention comprises using a computer processor to create an alternative communication path from a list of a list of Shared Risk Link Groups, SRLGs, or Shared Risk Groups, SRGs, comprising reducing the list of SRLGs or SRGs by deleting from the list those SRLGs or SRGs which are wholly contained in another SRLG or SRG of the list or at least one SRLG or SRG which is wholly contained in another SRLG or SRG of the list, and operating an alternative path determining algorithm on the reduced list, and storing the alternative communication path determining details in computer memory.

According to a further aspect the invention comprises a communications network having a route controlling server for defining pathways for telecommunications signals from a first location (A) in the network to a second location (B) in the network, and having access to a first memory containing routing instructions for telecommunications travelling from the first location (A) to the second location (B), and an alternative routing server adapted to produce alternative pathways from the first location to the second location and to store alternative pathway data in a second memory, wherein the alternative routing server produces alternative pathway data using the algorithm of the second aspect of the invention, and wherein the route controlling server is adapted to respond to an indication that there is a fault in the pathway specified in the first memory from the first location (A) to the second location (B) by causing the telecommunication from (A) to (B) to be routed using the alternative routing pathway data in the second memory.

The first and second memories may comprise the same memory. The route controlling server and the alternative routing server may comprise the same server.

Whilst it will normally be the case that we compare each group of links with every other group of links in a list of groups of links, we do not want to provide a way around this patent by making it essential to do so. We could omit the comparison of a group of links with one or more other groups of links, provided that the group of links is compared with many other groups of links so as to reduce significantly the overall number of groups of links in the list, thereby significantly reducing the calculators required to determine the alternative routing path.

Similarly, when it has been determined that a particular first group of links is a wholly contained subset of another group of links we will normally delete the first group of links from the list of groups of links. However, this is not required. It may still significantly reduce the number of calculations required to determine an alternative routing path to deleting many of the redundant groups, or most (over half) of the redundant groups, or to delete some, or even one, of the redundant groups from the list of groups.

The invention may comprise comparing just one group of links with another second group of links, determining that the one group is a wholly contained subset of the second group, and deleting the said one group. Repeating this process can further reduce the number of groups that are input into an alternative route determining algorithm and will achieve greater returns/savings in processing time and processing power required.

The claims should be read so as to include the above.

Other features of the invention will be apparent from the following description of preferred embodiments shown by way of example only in the accompanying drawings, in which.

Figure 1:
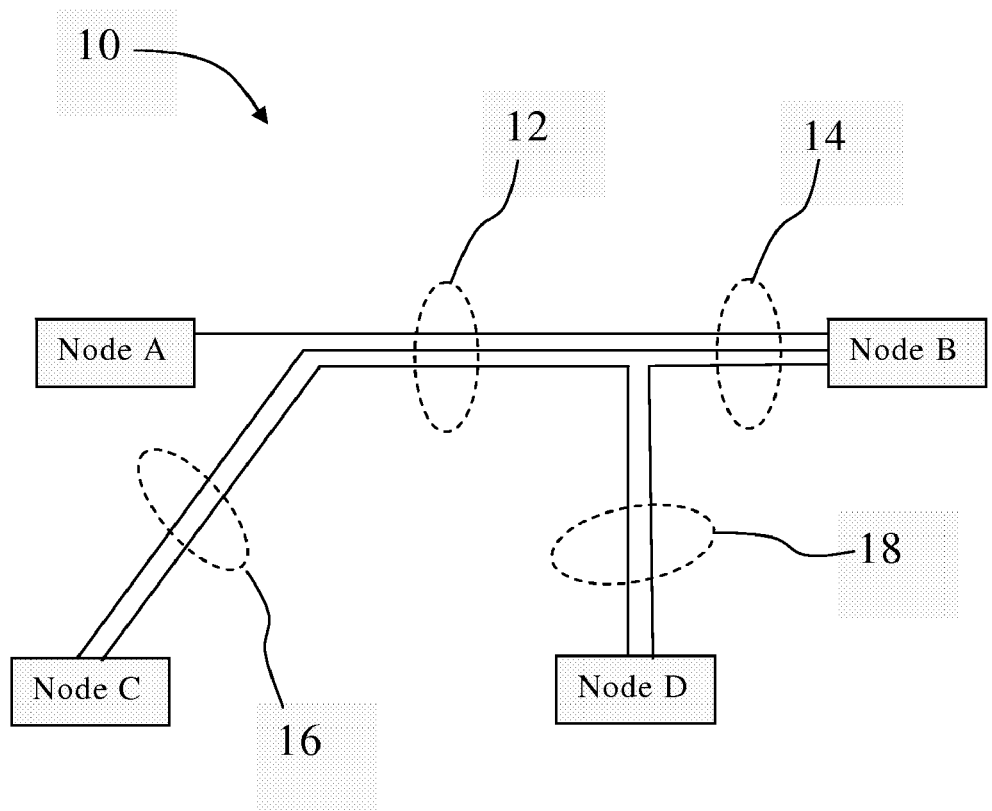
FIG. 1 is a schematic diagram of a basic network to which the invention can be applied.

With reference to FIG. 1 there is shown a schematic diagram of a basic network, generally designated 10, to which the invention can be applied. The network 10 includes four nodes A, B, C, D and four links AB, BC, CD, BD as summarised in Table 1.

TABLE 1

Links between nodes.

| From | to | Link |
|------|-----|------|
| A | B | AB |
| C | B | BC |
| C | D | CD |
| D | B | BD |

In FIG. 1 four ducts are represented at four ellipses 12, 14, 16, 18. The ducts are underground pipes or passageways that have different links passing through them. It can be seen that where links travel in the same duct they may be affected by the same fault. For example if the duct represented by the ellipse 12 was cut, for example by accident due to road works, the links AB, BC and CD would be lost.

Using the concept of Shared Risk Link Groups (SRLGs) the ellipses 12, 14, 16, 18 represent groups of links which may be susceptible to the same fault in the network 10. For clarity reference is made to SRLGs, however, it will be appreciated that the disclosure equally applies to Shared Risk Groups (SRGs). The corresponding four SRLGs also designated by the numbers 12, 14, 16, 18 are summarised in the Table 2. The SRLGs 12, 14, 16, 18 comprise a data set.

TABLE 2

Links in each SRLG

| SRLG | Links in the group |
|---|---|
| 12 | AB, BC, CD |
| 14 | AB, BC, BD |
| 16 | BC, CD |
| 18 | BD, CD |

It can be seen from Table 2 that the SRLG 16 is a subset of the SRLG 12 so that the SRLG 16 is completely contained within the SRLG 12. We have appreciated that the SRLG 16 can be deleted from the data set without reducing the efficiency in the calculation and allocation. Doing this makes it possible to make a reduction in the number of SRLGs to be considered in the subsequent computation of alternative protection paths.

In this way the SRLG concept according to the invention is used within a known routing algorithm to avoid the calculation of two routings that are intended to be disjointed, but pass through the same SRLG. This means that if some link associated with a general SRLG x is part of a path, no other link of the same SRLG can be part of the disjointed path. Generalising this concept it can be observed that if SRLG y includes all the links of SRLG x, then all of the resources which are to be avoided are specified in SRLG y and hence SRLG x is redundant.

To perform the method according to the invention in a general case, one firstly produces a list of all of the SRLGs to be analysed. Then each SRLG is compared with all of the other SRLGs in the list to verify whether it is a subset of another SRLG. If any subsets are found these are deleted from the list. The remaining SRLGs in the list represent all of the data to be used in computing alternative disconnected paths.

The steps of the method can be realized with an algorithm which performs the following steps:
make a list of unexamined SRLGs including therein all the SRLGs requiring to be analysed
   {for each SRLG x unexamined:
      {compare it with each of the other unexamined SRLG y
         if SRLG y is a subset of SRLG x, delete SRLG y and
         continue the internal loop, otherwise if SRLG x is a
         subset of SRLG y, delete SRLG x and exit from the
         internal loop}
if SRLG x has not been deleted, mark it as examined and assign it to a reduced list}

An algorithm which performs these steps continues the external loop as long as the list of unexamined SRLGs is not empty. The use of an algorithm as outlined above allows for optimisation of the SRLG reduction operations to produce a reduced list of SRLGs. The reduced list can be used in computing any disjointed alternative paths in a known manner.

If the method of the invention is applied to the network 10 in FIG. 1, the list of unexamined SRLGs is initialized with the data of table 2. It is seen that SRLG 12 includes SRLG 16 and therefore SRLG 16 can be deleted. One continues the procedure systematically until no other SRLGs can be deleted. In the network 10 of FIG. 1, the SRLGs to be considered in computation of the alternative paths are thus reduced from four to three.

Whilst the above example of how the invention is performed shows a simplified network 10 having four nodes and four links, a real life network may have many thousands of nodes and links. It will be appreciated that reducing the number of SRLGs may significantly reduce the number of individual computation steps involved in allocating and assigning protection paths to a network. An example of the benefits involved in the deletion of SRLGs in a more complex network is now provided in FIG. 2.

Figure 2:
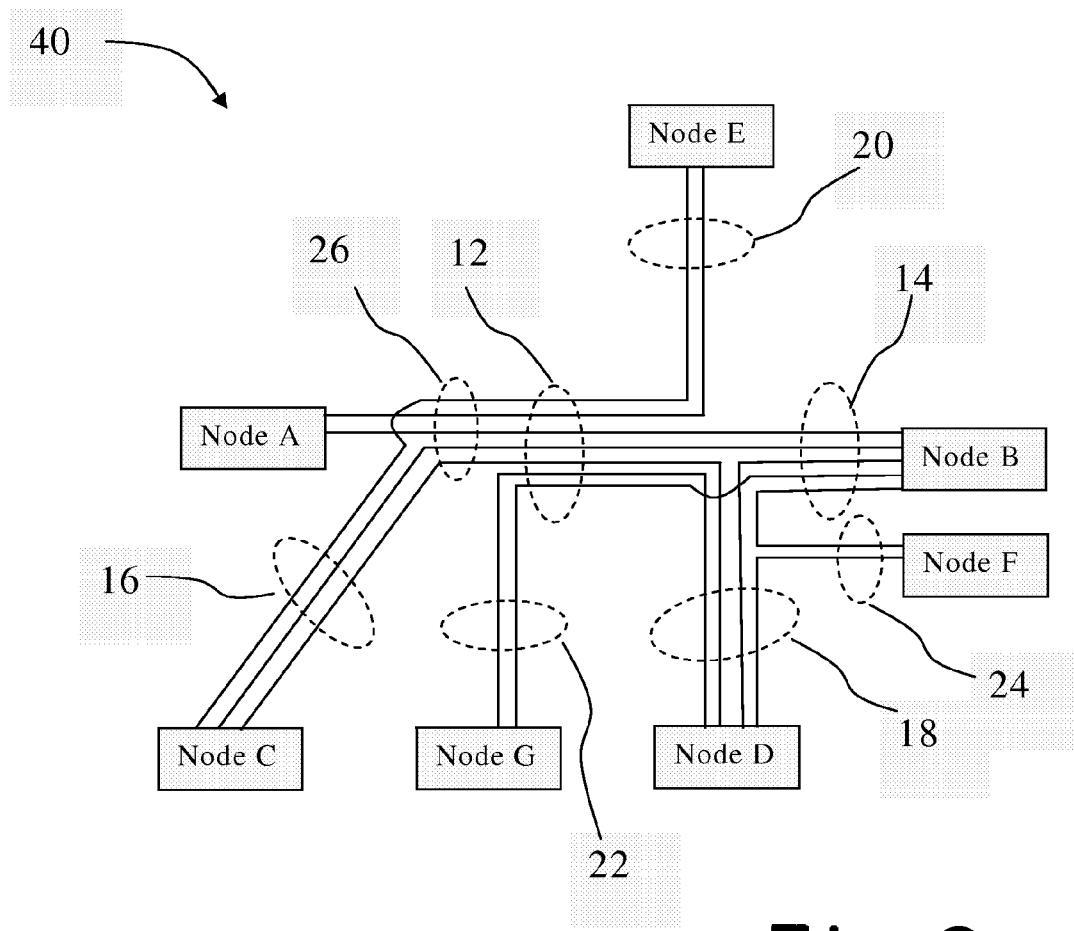
FIG. 2 is a schematic diagram of a more complex network to which the invention can be applied.

In FIG. 2 a more complex network 40 is shown to which the present invention can be applied. Like features to the network of FIG. 1 are shown with like reference numerals. In FIG. 2 three additional nodes E, F and G are shown which are connected with links as shown in Table 3 so that there are a total of 7 nodes and 10 links.

TABLE 3

Links between nodes.

| From | to | Link |
|---|---|---|
| A | B | AB |
| A | E | AE |
| B | C | BC |
| B | D | BD |
| B | G | BG |
| B | F | BF |
| C | E | CE |
| C | D | CD |
| D | G | DG |
| D | F | DF |

In FIG. 2 four additional ducts are represented at four additional ellipses 20, 22, 24, 26 so that each duct has different links passing through it. In total there are eight ducts in the network 40. Using the concept of SRLGs the ellipses 12, 14, 16, 18, 20, 22, 24, 26 represent corresponding SRLGs also designated by the numbers 12, 14, 16, 18, 20, 22, 24, 26 having links as summarised in the Table 4.

TABLE 4

Links in each SRLG

| SRLG | Links in the group |
|---|---|
| 12 | CE, AE, AB, BC, CD, DG, BG |
| 14 | AB, BC, BD, BG, BF |
| 16 | CE, BC, CD |
| 18 | DG, CD, BD, DF |
| 20 | CE, AE |
| 22 | DG, BG |
| 24 | BF, DF |
| 26 | CE, AE, AB, BC, CD, |

It can be seen from Table 4 that the SRLG 16 is a subset of the SRLG 26 so that the SRLG 16 is completely contained within the SRLG 26. The SRLG 16 can therefore be deleted. The SRLG 26 is wholly contained within the SRLG 12 so that the SRLG 26 can be deleted. The SRLG 22 is wholly contained within SRLG 12 so that the SRLG 22 can be deleted. The SRLG 20 is wholly contained within the SRLG 12 so that the SRLG 20 can be deleted. Using the method of the invention the number of SRLGs can be reduced from eight to four.

It will be appreciated that the larger the number of nodes and links in a given network the larger the reduction of SRLGs will potentially be. It will also be appreciated that the above description of embodiments applying the innovative principles of this invention are given by way of non-limiting examples.

When the above technique has been used to reduce a list of SRLG groups to a list in which no SRLG group is fully contained as a subsumed subset of another SRLG group in the list, we would run a known alternative communication path algorithm on the reduced list of SRLG groups to generate one or more alternative paths (data identifying or specifying alternative communication paths to be used in the event of a failure of a part of the main path). Those alternative path instructions are stored in computer memory and accessed and used to control the communication path in the event of a failure of a component in the main path. The known alternative path algorithm is an automatic way of providing alternative paths which are implemented by a centralised or distributed control plane. It will be appreciated that providing alternative paths could be implemented manually from a management system of the network. In both cases, the calculation of the connections to support the services is performed from a database of the network topology which includes information about the nodes and links of the network. Such a database may be a single centralised database or may be a distributed database which is replicated on all nodes in the network.

Figure 3:
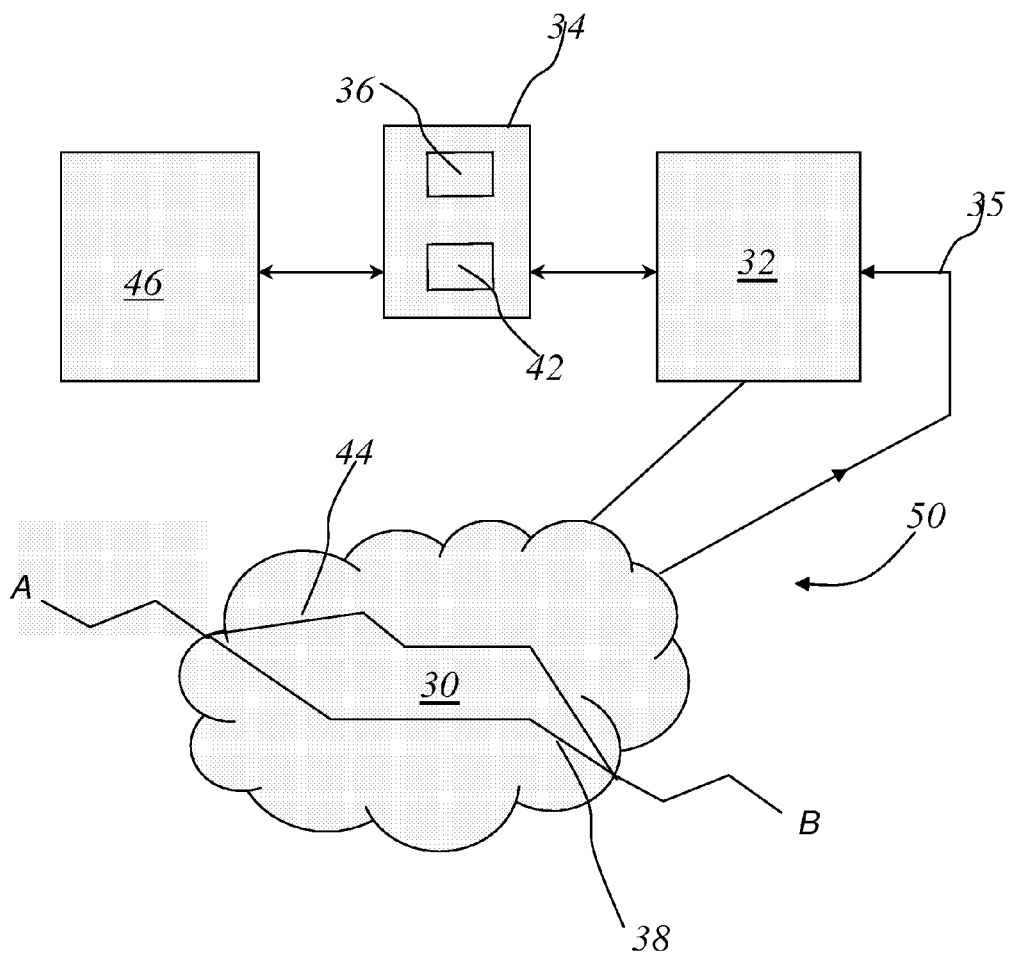
FIG. 3 is a schematic diagram of a communications network implementing the alternative route computing strategy.

A communications network implementing the alternative route computing strategy desired above is shown in FIG. 3. The network 50 comprises numerous nodes and links, represented schematically by cloud 30. It will be appreciated that there are many alternative routes through the network for telecommunications traffic travelling from a first point in the network A, to a second point in the network 50, B.

Which route a communications signal takes is defined by route controlling server 32. Route controlling server 32 has access to a memory 34 which contains route data 36. Route data comprises a look-up table of pre-specified routes, made up of sets of links, between specified points.

In case of a fault on one of the links in a standard route 38 between locations A and B, the fact that there is a fault in one of the links is conveyed to the server 32 via input 35. The route controlling server then, responsive to the knowledge that this is a fault, refers to alternative route data 42 saved in memory 34, to choose an alternative route 44 through the network 50, avoiding the fault.

Alternative route data 42 is calculated by an alternative routing server 46, and stored in the memory 34 by the alternative routing server 46. Alternative routing server 46 uses the algorithm and method described above to reduce the size of calculation needed to produce alternative route data 42.

It will be appreciated that route controlling server 32 and the alternative routing server 46 need not be separate, but could be the same server. The "normal" routing data 36 and the alternative routing data 42 could be stored in different memories instead of the same physical memory as shown in FIG. 3.

Memory 34 can be any suitable memory, and for example might be remote from the server, might be a removable storage device, or might be part of the server hardware itself, or might be a further option.

It will be appreciated that in an alternative embodiment there may be no error signal 35 provided specifically to the routing server 32. For example, the routing server may automatically use the alternative route pathway if it has not had an acknowledgement of a successful "handshake" with a downstream communications device after a predetermined time—it may timeout to the alternative route pathway. Other ways of knowing that the alternative route should be used may exist.

More than one alternative pathway may be determined, and stored in memory. The routing server may use second, third, etc, alternative pathways if the first (or earlier) alternative does not work. We can contemplate calculating a plurality of alternative pathways because our route-determining process operates on significantly fewer links/significantly fewer groups of links in comparison to not applying the process of the invention to the list of groups to remove some of them.

The invention claimed is:

1. A computer-implemented method of processing data for computing alternative paths in an optical communications network, the method comprising:
   generating a list of groups that comprise communication links in an optical communications network, wherein the links in a given group share a risk of being affected by a fault;
   comparing one or more groups in the list with other groups in the list to determine whether a group include the same communication links as another group; and
   deleting a group from the list if the communication links in the group are a subset of the communication links in another group.

2. The computer-implemented method of claim 1 further comprising calculating alternative paths for the communication links in the optical communications network using the remaining, non-deleted groups in the list.

3. The computer-implemented method of claim 1 wherein the groups are comprised of one of a Shared Risk Link Group (SRLG) and a Shared Risk Group (SRG).

4. A non-transitory computer readable medium for a computer associated with an optical communications network having a plurality of nodes, the nodes being connected via communication links grouped into a list of one of Shared Risk Link Groups (SRLGs) and Shared Risk Groups (SRGs), wherein the SRLGs or SRGs include communication links that share a risk of being affected by the same fault, the computer readable medium having instructions stored thereon, the instructions configured to cause the computer to:
   generate a list of unexamined SRLGs or SRGs that includes all SRLGs or SRGs to be analysed;
   for each unexamined $SRLG_x$ or $SRG_x$ in the list:
      compare the unexamined $SRLG_x$ or $SRG_x$ with one or more other unexamined $SRLG_y$ or $SRG_y$ in the given list;
      if the communication links in a given $SRLG_y$ or $SRG_y$ are a subset of the communication links in the $SRLGs_x$ or $SRGs_x$:
         delete the $SRLG_y$ or $SRG_y$; and
         continue comparing the unexamined $SRLG_x$ or $SRG_x$ with one or more other $SRLG_y$ or $SRG_y$;
      if the communication links in $SRLG_x$ or $SRG_x$ are a subset of the communication links in another $SRLG_y$ or $SRG_y$, delete the $SRLG_x$ or $SRG_x$; and
      if the $SRLG_x$ or $SRG_x$ has not been deleted as being a subset of $SRLG_y$ or $SRG_y$, mark the non-deleted $SRLG_x$ or $SRG_x$ as having been examined and assign it to a reduced list.

5. The non-transitory computer readable medium of claim 4 wherein continuing to compare the unexamined $SRLG_x$ or $SRG_x$ with one or more other $SRLG_y$ or $SRG_y$ comprises continuing to compare the unexamined $SRLG_x$ or $SRG_x$ with other $SRLG_y$ or $SRG_y$ until all $SRLG_y$ or $SRG_y$ in the list have been compared.

6. A computer-implemented method of reducing the computer processing power required for a computer processor to determine an alternative path from a list of Shared Risk Link Groups (SRLGs) or Shared Risk Groups (SRGs) comprising communication links that share a risk of being affected by the same fault, the method comprising:
   generating a reduced list by deleting one or more SRLGs or SRGs in the list that are subsets of at least one other SRLG or SRG in the list; and
   executing an alternative path determination process on the reduced list to determine an alternative path.

7. A non-transitory computer-readable medium having instructions stored thereon configured to cause a computer executing the instructions to reduce the computer processing power required for a computer processor to determine an alternative path from a list of Shared Risk Link Groups (SRLGs) or Shared Risk Groups (SRGs) comprising communication links that share a risk of being affected by the same fault, the computer-readable medium having instructions stored thereon configured to cause a computer executing the instructions to:
   generate a reduced list by deleting one or more SRLGs or SRGs in the list that are subsets of at least one other SRLG or SRG in the list; and
   execute an alternative path determination process on the reduced list to determine an alternative path.

8. A communications network comprising:
   a route controlling server configured to define communication paths for telecommunications signals between a first location in the network and a second location in the network, and having access to a first memory containing routing instructions for routing communications from the first location to the second location; and
   an alternative routing server configured to produce alternative communication paths from the first location to the second location, and to store alternative path data in the first memory, wherein the alternative routing server produces alternative path data by:
      generating a list of groups that comprise communication links between nodes in the communications network, wherein the links in a given group share a risk of being affected by the same fault;
      comparing one or more groups in the list with other groups in the list;
      deleting a group from the list if the communication links in the group are a subset of the communication links in another group, to create a reduced list; and
      defining an alternate communication paths for telecommunications signals between the first location and the second location using the reduced list; and
   wherein the route controlling server is further configured to respond to an indication of a fault in the defined communication path by causing telecommunications signals to be routed from the first location to the second location using the alternate communication path.

* * * * *